(12) United States Patent
Nakamats

(10) Patent No.: US 6,225,705 B1
(45) Date of Patent: May 1, 2001

(54) CONVECTION ENERGY GENERATOR

(76) Inventor: Yoshiro Nakamats, 1105-10-1, Minami-Aoyama 5-chome, Minato-ku, Tokyo (JP)

( * ) Notice: Subject to any disclaimer, the term of this patent is extended or adjusted under 35 U.S.C. 154(b) by 0 days.

(21) Appl. No.: 09/588,365

(22) Filed: Jun. 6, 2000

Related U.S. Application Data

(62) Division of application No. 09/166,725, filed on Oct. 5, 1998.

(30) Foreign Application Priority Data

Oct. 4, 1997 (JP) .................................................. 9-307781

(51) Int. Cl.[7] ........................................................ F03G 6/00
(52) U.S. Cl. .............................. 290/43; 290/54; 290/1 R; 290/2
(58) Field of Search ..................................... 290/1 R, 1 A, 290/2, 43, 44, 54, 55

(56) References Cited

U.S. PATENT DOCUMENTS

| | | | |
|---|---|---|---|
| 4,114,046 | * 9/1978 | Yousef | 290/55 |
| 4,122,356 | * 10/1978 | Decker | 290/52 |
| 4,200,783 | * 4/1980 | Ehret | 219/365 |
| 5,014,770 | * 5/1991 | Palmer | 165/48.2 |
| 5,156,927 | * 10/1992 | Nakamats | 429/21 |
| 5,300,817 | * 4/1994 | Baird | 290/55 |
| 5,323,061 | * 6/1994 | Immler et al. | 290/2 |
| 5,394,016 | * 2/1995 | Hickey | 290/55 |
| 5,605,391 | * 2/1997 | Wood | 362/35 |

* cited by examiner

Primary Examiner—Nicholas Ponomarenke
(74) Attorney, Agent, or Firm—Jordan and Hamburg LLP

(57) ABSTRACT

An energy generation system utilizes convection flow of a fluid media caused by differences in temperature to generate useful energy therefrom. A conduit for directing convection circulation permits conversion of forces associated with the movement of the fluid media in the conduit into a usable energy by its effect of a generation device as the fluid media flows past such device.

1 Claim, 9 Drawing Sheets

CONVECTION ENERGY GENERATOR

This is division of application Ser. No. 09/166,725, filed Oct. 5, 1998.

BACKGROUND OF THE INVENTION

The present invention relates to an energy generating system, and more particularly, a system suitable for use in, or external of, a house, building, factory or other structure for generating electrical, mechanical and other energy by convection utilization.

Power generation by solar energy using conventional technology is inefficient, providing an efficiency, for example, of about only 15%. In addition, the cost associated with solar energy generation is generally high.

In living areas, and in and about various other enclosed structures, convection is a naturally occurring phenomenon caused by temperature differences at upper and lower indoor positions. Its usefulness however in converting the energy of the air stream associated with such convention has heretofore been neglected, despite the ability to efficiently harness its energy.

Accordingly, it is an object of the invention to provide a convection energy generating system which overcomes the drawbacks of the prior art.

It is a further object of the invention to provide a convection energy generating system which efficiently and economically converts convectional flow into useful energy.

It is yet a further object of the invention to utilize convection of fluid by connecting both portions high and low in temperature to each other, or operating on the chimney effect and high temperature obtainable from solar heat, air-conditioning heat, cooking heat, body heat, general living heat, etc., and produce useful electrical and/or mechanical energy, ventilation energy and other energies therefrom.

SUMMARY OF THE INVENTION

Briefly stated, the present invention provides an energy generation system which utilizes convection flow of a fluid media caused by differences in temperature to generate useful energy therefrom. A conduit for directing convection circulation is provided for permitting conversion of forces associated with the movement of the fluid media in the conduit into a usable energy by its effect on a generation device as the fluid media flows past such device.

In accordance with various embodiments directed to use in generating electrical energy in a home environment or other building structure, the energy generation system comprises a conduit into which is vented heated air from the interior of the structure. The conduit is open to the outside at a top thereof, such that by virtue of the chimney effect, an upwardly rising stream of air within the conduit is produced by convection. A fan-operated generator placed in contact with the stream of air produces usable electricity.

In alternative embodiments also directed to electrical generation for various building structures, the conduit referred to above for channeling a stream of convected air is placed external of the building and is heated by solar rays which create the flow of air within the conduit.

In further embodiments, directed to use in connection with building structures as well as hand-held applications, such as for example in cameras and cellular phones, instead of employing air, a magnetic fluid is used to conduct convention forces. Energy is generated by a coil wound about a continuous enclosed conduit in which the fluid is made to circulate, and which generates electricity by Fleming's right hand rule.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7c is a schematic longitudinal view of a variation of the embodiments of FIG. 7a;

DETAILED DESCRIPTION OF THE INVENTION

Figure 1:
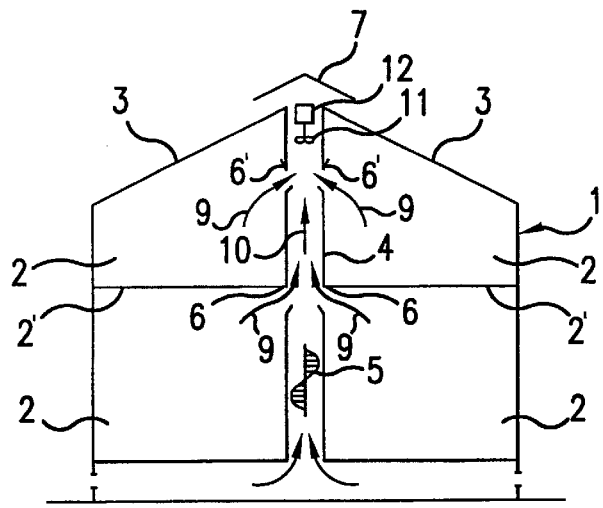
FIG. 1 is a schematic longitudinal cross-section of a first embodiment of a convection energy generating system in accordance with the invention.

Referring to the figures, and in particular FIG. 1, an embodiment of a convection energy generating system in accordance with the invention is depicted, directed to use in ventilating a living space and converting air convection caused by environmental heat produced in a house, including for example body warmth and artificially created heat, into useful energy. A conduit 4 in the form, for example, of an exhaust pipe or a chimney, stands vertically, advantageously at the center of building structure 1, and extends through room 2, ceiling 2' and roof 3. Conduit 4 includes holes 6 and 6' near ceiling 2' of room 2.

Warm convection 9 of heat produced by heating of room 2 by artificial sources and body heat is drawn into conduit 4 through holes 6, 6' and once inside comprises a rising air stream 10 created by the chimney effect. Rising stream 10 turns a fan 11 near the upper top of conduit 4, which in turn operates a power generator 12 drivably connected therewith. In this manner electric power can be obtained from power generator 12 by warm convection 9.

Conduit 4 can provide several advantages concomitant with its usefulness in channeling rising stream 10 upward for purposes of energy generation. One advantage gained is that conduit 4 naturally provides improved ventilation to room 2 by operation of the chimney effect. Other advantages are attained in various optional embodiments. In one such advantageous embodiment, conduit 4 may be made structurally supportive to function as a post in part of building structure 1. In an alternative embodiment, where desired, conduit 4 may be made partially transparent by glass, etc., thus functioning as a light court to supplement the lighting of room 2. In yet another embodiment, conduit 4 may form a central support for a spiral staircase 5, thereby improving the efficient use of space in house 1.

An optional small roof 7 is provided at upper opening of conduit 4 to prevent the penetration of rainwater therein. It is noted that where conduit 4 functions as a light court, as referred to above, small roof 7 should preferably be clear or light transmissive. If small roof 7 is omitted, fan 11 rotates to force away rain and simultaneously generate electricity. A lid may be optionally provided at the upper part of conduit 4, for purposes of selectively stopping rising stream 10, when necessary. The cross-sectional dimensions of conduit 4 will determine the conforming shape of the lid, for example, square, rectangle, triangle, etc.

Figure 2:
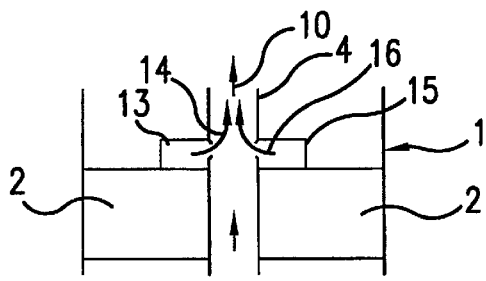
FIG. 2 is a schematic longitudinal cross-section of a second embodiment of a convection energy generating system in accordance with the invention.
Figure 3:
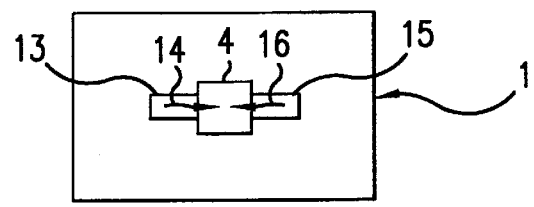
FIG. 3 is a schematic plan view of the embodiment of FIG. 2.

FIGS. 2 and 3 depict a second embodiment in accordance with the invention. Steam and hot air in a bath room 13, and unpleasant odors 16 in a lavatory 15, are vented and exhausted by rising stream 10 in conduit 4.

Figure 4:
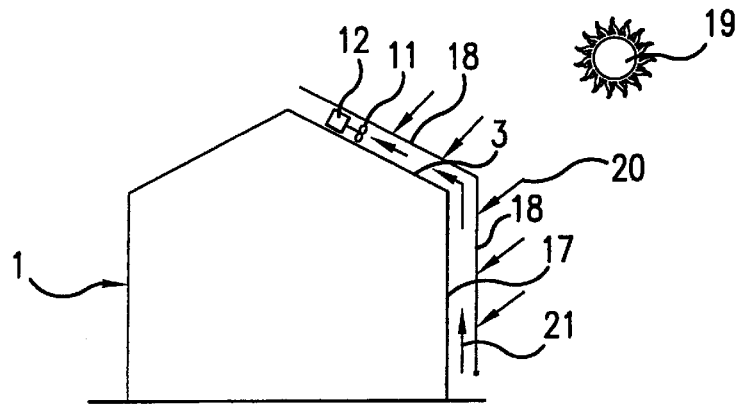
FIG. 4 is a schematic longitudinal cross-section of a third embodiment of a convection energy generating system in accordance with the invention.

FIG. 4 shows an embodiment of the invention wherein a passage 18 of black square pipe or round pipe, etc. are placed along an outer wall 17 and a roof 3 of building structure 1. Power generator 12 with fan 11 are provided within passage 18 proximate a top end thereof.

When passage 18 is heated by solar rays 20 of the sun 19, a rising air stream 21 is generated by heat effects within passage 18 which turns fan 11 to yield power generation. A suitable form for fan 11 includes, for example, propeller-fan, cross-flow-fan, sirocco-fan, etc.

Passage 18 can be built as part of building structure 1, or can alternatively be sold as a separate adaptor to be attached to completed construction. Optionally, heat efficiency is advantageously enhanced by inclusion of a fin (not shown) having a large heat absorption capability, attached to the surface of passage 18 or where the surface is treated for enhanced heat absorption.

Figure 5:
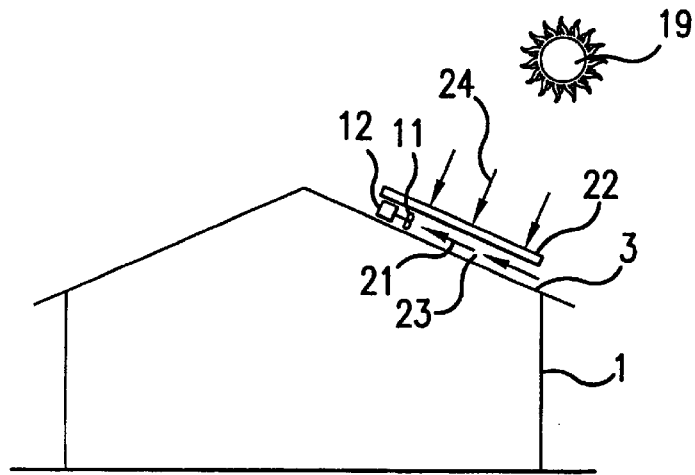
FIG. 5 is a schematic longitudinal cross-section of a fourth embodiment of a convection energy generating system in accordance with the invention.

Turning now to FIG. 5, an embodiment of the invention is depicted in which a solar battery 22 is installed on roof 3 of building structure 1, and both sides of space between roof 3 and solar battery 22 are enclosed to create a hollow passage 23. As in the previously described embodiments, power generator 12 and fan 12 are installed advantageously at or near the top end of passage 23.

When light 24 of the sun 19 shines on solar battery 22, electric power is obtained directly therefrom, and at the same time battery panel 22 is heated by the sun. As a result, hollow passage 23 is also heated to produce rising air stream 21 by the chimney effect. This air stream is gathered together by means of air circuits, as will be more fully described with reference to FIG. 7, and turns fan 11 to generate electricity. By changing sun light to electricity through solar battery 22 and power generator 12 operated by solar heat, and therefore making more complete use of solar energy, it is possible to obtain electric power with improved thermal efficiency.

Figure 6:
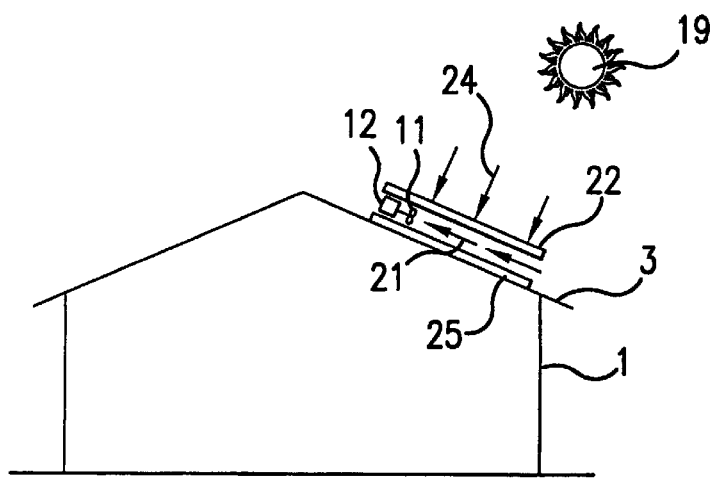
FIG. 6 is a schematic longitudinal cross-section of a fifth embodiment of a convection energy generating system in accordance with the invention.

Referring now to FIG. 6, an embodiment of the invention is shown which employs triple construction power generating equipment for further utilization of the potential of the sun. In addition to solar battery panel 22, a hot-well 25 is placed on roof 3 and enclosed to create a hollow passage in a manner analogous to the embodiment of FIG. 4. Rising air stream 21 produced between solar battery panel 22 and hot-well 25 turns fan 11 of power generator 12. This integrated system, combining three forms of solar energy generation, maximizes use of the solar energy potential. In particular, radiant energy from the sun 19 is used simultaneously for generation of electric power by solar battery panel 22, generation of supplementary electric power by operation of power generator 12 by convected rising air stream created by the heat of the sun 19, and solar heat warming of water by hot well 25.

Figure 7A:
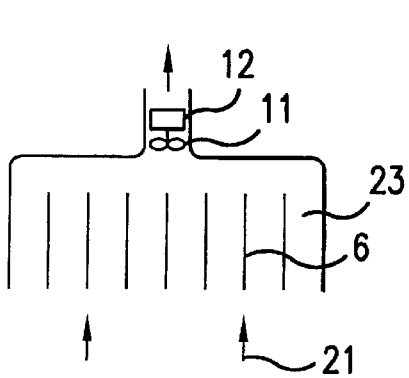
FIG. 7a is a schematic partial plan view of the embodiments of FIGS. 5 and 6.

FIG. 7a shows a top view of hollow passage 23 under solar battery panel 22 in the embodiments shown in FIGS. 5 and 6, wherein passage 23 is partitioned with separating panels to create multiple converging air circuits which consolidate and direct rising air stream 21 to fan 11 of power generator 12.

Figure 7B:
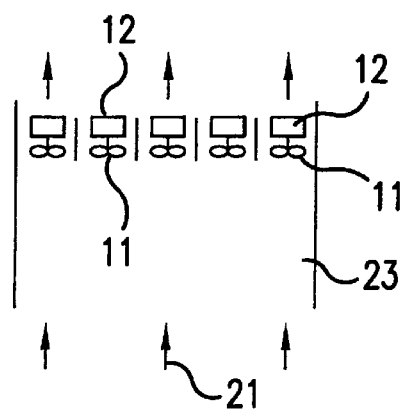
FIG. 7b is a schematic partial plan view of the embodiments of FIGS. 5 and 6 utilizing laterally disposed multiple fan-operated generators.

The embodiment of FIG. 7b utilizes multiple, laterally disposed fan/generator pairs 11, 12.

Figure 7C:
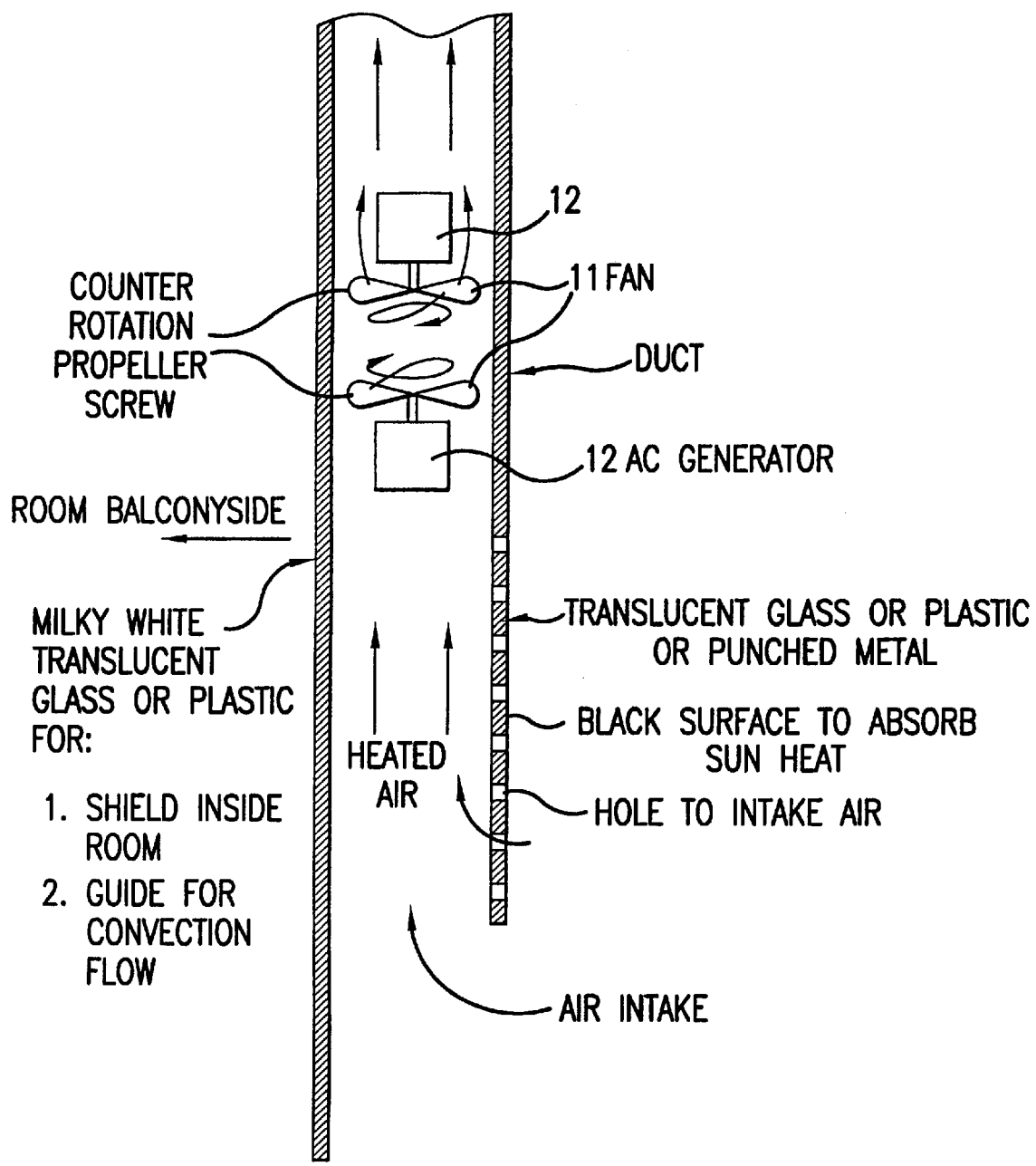

FIG. 7c illustrates a variation of the previous embodiment of FIG. 7a, wherein two fan/generator pairs 11, 12 are placed in-line for counter-rotation. A one side of passage 23 is defined by a milky white translucent material, and the remaining side (illustrated by dashed lines) is a black punched metal.

Figure 8:
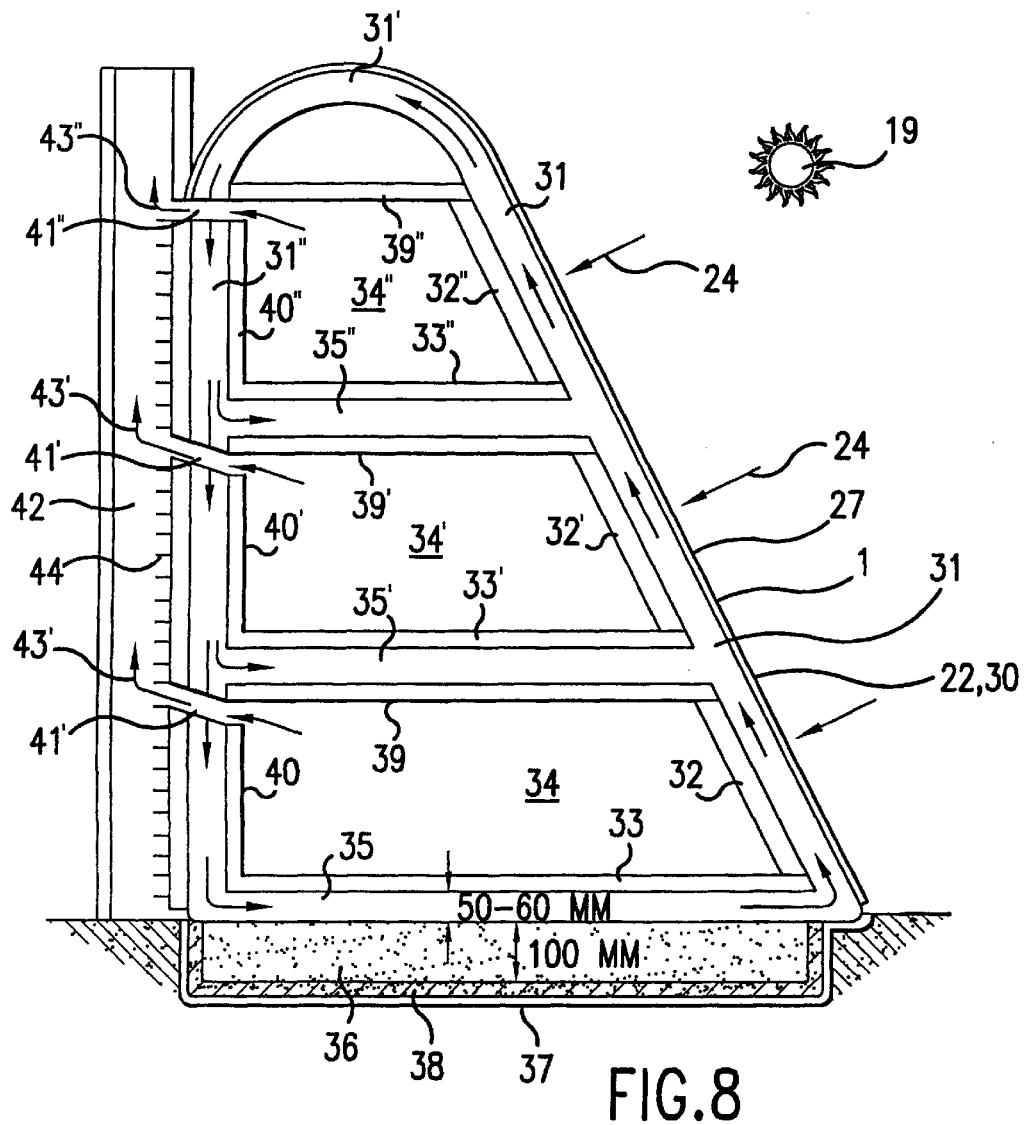
FIG. 8 is a schematic longitudinal cross-section of a sixth embodiment of a convection energy generating system in accordance with the invention.
Figure 9:
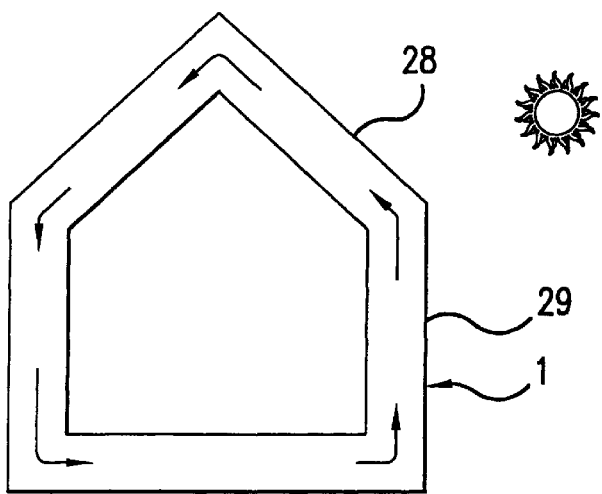
FIG. 9 is a schematic longitudinal cross-section of a seventh embodiment of a convection energy generating system in accordance with the invention.
Figure 10:
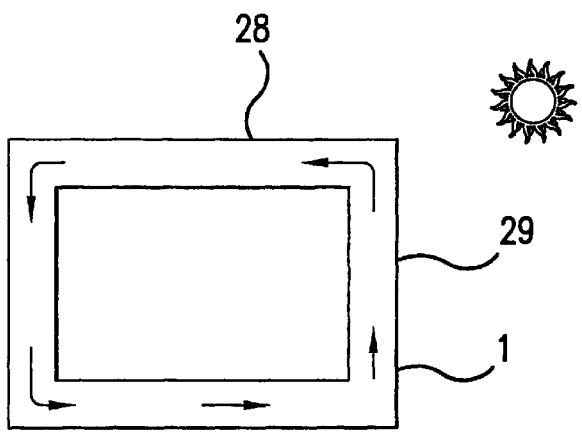
FIG. 10 is a schematic longitudinal cross-section of a eighth embodiment of a convection energy generating system in accordance with the invention.

FIG. 8 shows an example in accordance with another embodiment of the invention wherein the energy generation system is applied to a building in which circulation type air-conditioning is installed. It is believed to be approximately 15% more efficient to lean the southern side of building structure 1 at an angle of 30 degrees, as shown in FIG. 8, however it is nonetheless also possible to face a usual sloped roof 28 and a vertical wall 29 to the south, as shown alternatively in FIG. 9. Building structure 1 can be also be square as shown in FIG. 10. Solar battery panel 22 or glass, metallic plates, etc. are attached to outer wall 27 and inner walls 32, 32', 32" of building structure 1. Air passage 31 rises up, turns at position 31', descends at position 31" and passes under floors 33, 33', 33" of rooms 34, 34', 34", and turns to position 31, so that air circulates in passage 31. Inner walls 32, 32', 32" of building structure 1 work sufficiently well as heat insulating material to protect rooms 34, 34', 34" from solar heat, while at the same time inhibiting the escape of heat from air passage 31. Light rays from the sun 19 are changed to electricity by solar battery panel 22, and solar heat warms up air within air passage 31 by convection.

Floor 33 of room 34 at the first story is made of wood, and a space of about a 50 mm to 60 mm in thickness is made between floor 33, and 100 mm thick concrete ground 36 is deposited beneath air passage 35. The weight of building structure 1 rests upon concrete 36, which is also used for heat storage. Use of inexpensive concrete results in lower cost. For example, if reclaimed concrete obtained by destruction of concrete building or a new low cost cement called "Ecological Cement" (which is made of ashes reduced from refuse, limestone, etc. without producing dioxin) is used instead of concrete 36, expense for the installation of this layer is reduced.

Prior to laying the concrete, damp-proof plastic film sheet 37, such as polyethylene, is first applied, and then heat insulating material 38 is put on plastic film sheet 37. Concrete 36 is then deposited atop heat insulating material 38.

Space 35 comprises a portion of the circulating route in air passage 31 and, in a similar manner, spaces 35', 35" are made respectively under floor 33' on the second story and floor 33" on the third story to join air passage 31. Ceilings 39, 39', 39" and walls 40, 40', 40" are made of heat insulating material.

Air ducts 41, 41', 41" are provided near the ceiling in each room and lead to chimney 42. Chimney 42 vents exhaust 43, 43', 43" from rooms 34, 34', 34" by the chimney effect. If an emergency stairway 44 is built within chimney 42, the space factor is improved accordingly. If a transparent chimney 42 is built indoors, it can be used as light court. As a support, chimney 42 can also help to resist against side quake. It is also possible to apply chimney 42 to conduit 4 shown in FIG. 1.

Figure 11:
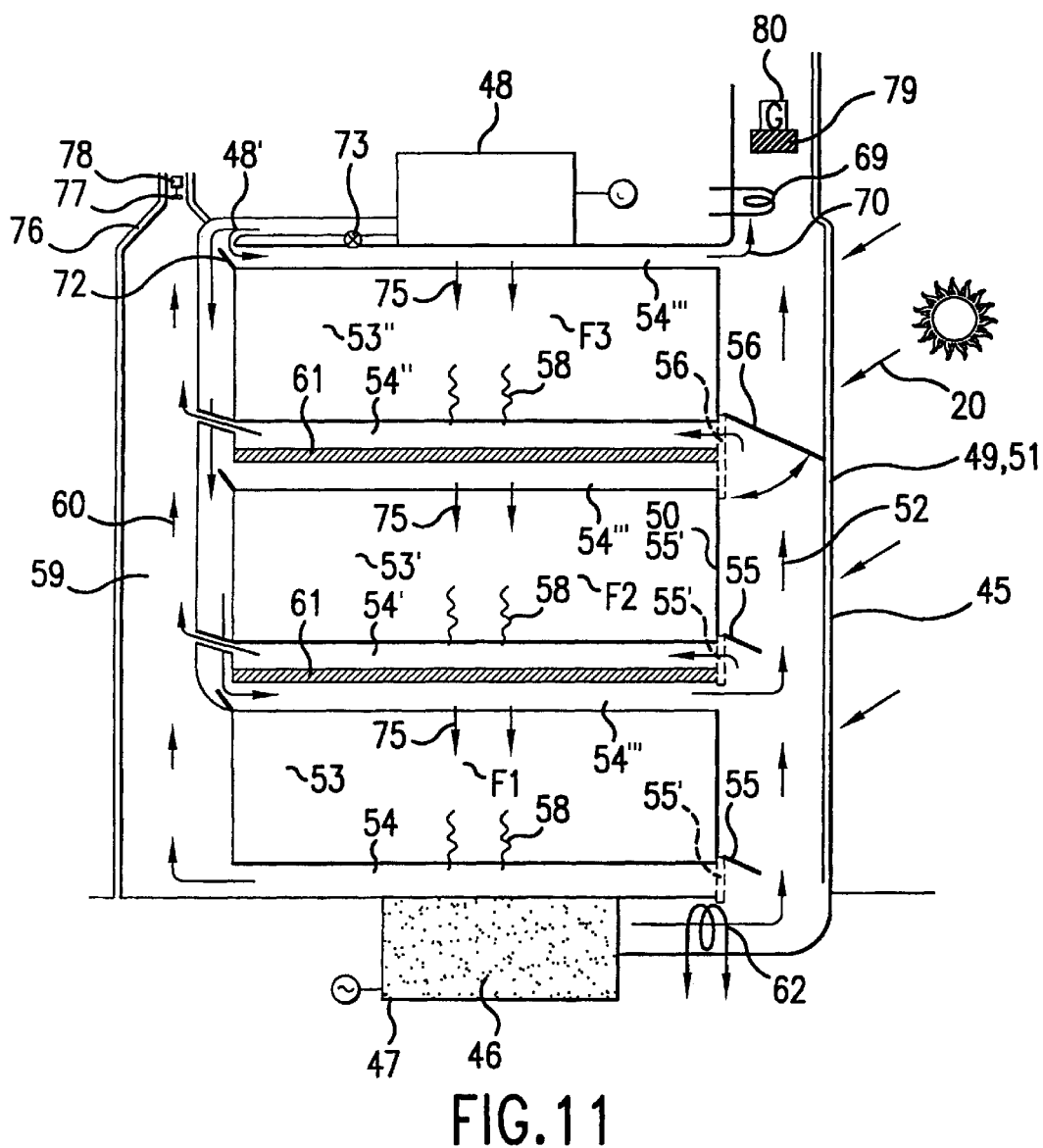
FIG. 11 is a schematic longitudinal cross-section of a ninth embodiment of a convection energy generating system in accordance with the invention.

FIG. 11 shows an example of an air conditioning system. Ecological cement (described above) is deposited underground as a cement layer 46, below a building 45. Cement layer 46 is heated by a heater (not shown) advantageously using less expensive night service power, and works as a heat storage 47.

Freezer 48, also advantageously operated by night service power, is set on the roof of building 45. The southern side of building is heated by solar rays 20, which in FIG. 11 is shown as the right side. This side has a glass plate or solar panel on an outer wall 49 and an inner wall 50, or a 2-ply glass plate 51, 51'. Heat convection fluid 52 rises up between outer wall 49 and inner wall 50. A door 55 is attached to the southern side under floors 54, 54' of rooms 53, 53'. The width of door 55 is about ½ the space between outer wall 49 and inner wall 50, or 2-ply glass plate 51, 51'. A door 56 is attached to top room 53", door 56 being of sufficient width to close the space between outer wall 49 and inner wall, or 2-ply glass plate 51, 51'. In the winter season, each door opens as shown by 55 and 56, and closes as shown by 55' and 56' in the summer season.

Since each door opens in the winter season, heat convection caused by solar heat within 2-ply wall 51, 51' warms up the space under floors 54, 54', 54" on each level, and each room is warmed by hot air 58 entering from below. The convection coming from between 2-ply wall 51, 51' becomes a rising air stream 60 at a chimney 59, and draws air under the floors to continue the flow of hot air to the rooms. A heat insulating layer 61 is set to thermally divide the warming space below the floor and a cooling space above the ceiling of the room below, mutually from one another. Chimney 59 can take the form of a pipe or conduit 4 of FIG. 1, and can utilize any of the aforementioned approaches, such as its secondary use as a light court.

Where solar heating provides insufficient warmth, forced hot air is supplied from underground heat storage source 47. A heat exchanger 62 is also provided for purposes of making hot water, and supplies hot water within building.

In the summer season, doors 55 and 56 are closed at positions 55' and 56', and the air heated by solar rays 20 flows upwardly through via rising air stream 52 caused by convection, and does not enter the space under floors 54, 54', 54". During this time, heat convection 52 is still used to heat water via another heat exchanger 69 for supply of hot water to the building. Also, rising air stream 52 caused by this convection draws air in ceiling 54" to the direction shown by the arrow designated by the numeral 70.

In the summer, door 72 opens in response to the opening of a valve 73 which sends cool air 48' from freezer 48 (placed on roof and operated by night service power) to above each ceiling and cool spaces F1, F2, F3 of rooms 53, 53', 53" cooled by cool air 75 coming from above the ceilings. Cool air 75 is drawn to the direction of 70 and a fresh inflow of cool air 48' from freezer 48 is sent in.

Electricity is generated by operation of a vertical axis type generator 78 rotated by horizontal fan 77. The top end of chimney 59 is narrowed into a tapered shape 76, to concentrate air stream 60 coming from below.

Since the space between 2-ply wall layer on the southern side of the building is comparatively narrow between walls while being expansive widthwise, a horizontal turning type fan 79 is placed at top space of 2-ply wall layer to obtain power generation by operation of a horizontal type generator 80 rotated by rising air stream 52 which turns fan 79.

Figure 12:
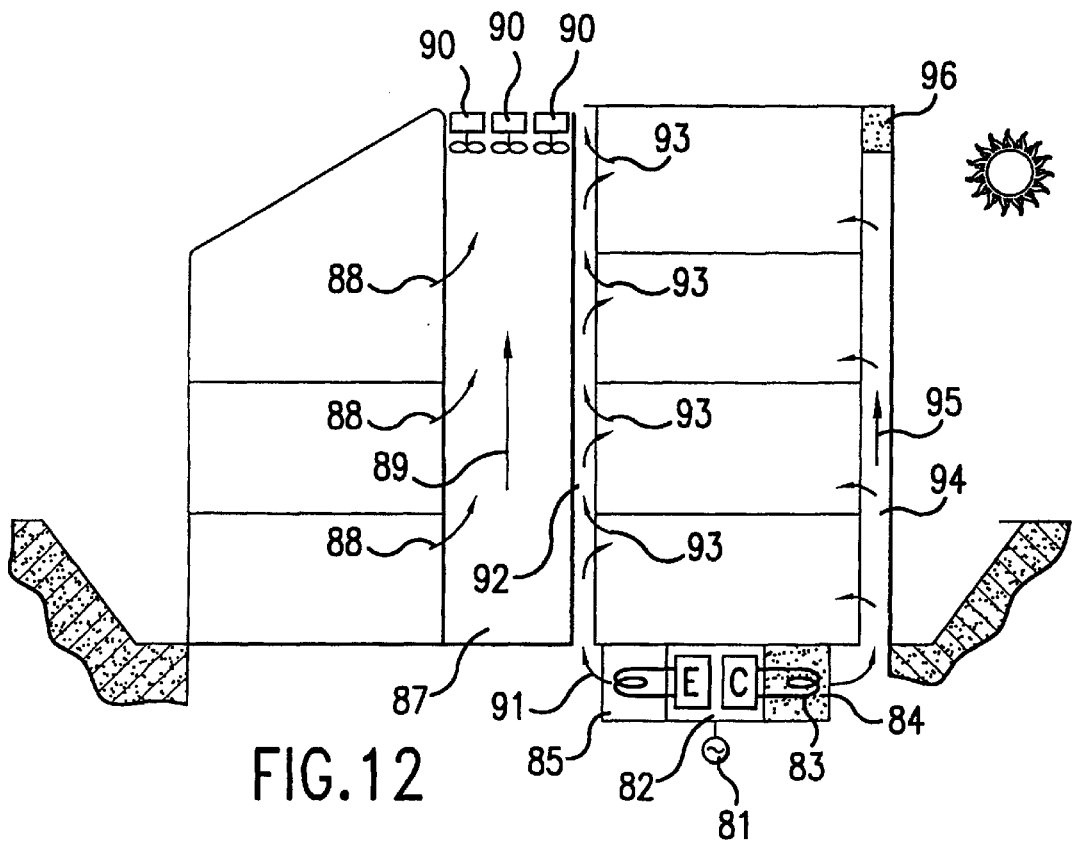
FIG. 12 is a schematic longitudinal cross-section of a tenth embodiment of a convection energy generating system in accordance with the invention.

Turning now to FIG. 12, an energy generation system in accordance with another embodiment of the invention is depicted. Machines operated by night service power for cold storage located on the roof and heat storage in the basement of FIG. 11 are combined into one unit. The combined unit, in the form of a cooler 82, is advantageously operated by night service power 81. Heat is stored in heat storage source 84, such as a slab of ecological cement, transferred thereto via a water filled radiator 83 of condenser C of cooler 82. A freezer 85 is operated by evaporator E of cooler 82 without requiring use of the roof, while concomitantly providing better cooling. Cooler 82 can be installed underground for better maintenance of cold storage. A hollow pole 87 making use of the structure of the building encloses a rising air stream 89 produced from indoor cooking, electric appliances, human body temperature, etc., within hollow pole 87, which operates a plurality of wind power generators 90 placed downward at an outlet on the top of hollow pole 87.

Cool air 91 coming from underground cooler 82 is drawn into each room replacing the warm air leaving the rooms as exhaust 93. Warm air coming from radiator of cooler 82 in the basement is supplied to each room by rising air stream 95 within a 2-ply wall layer 94 on the southern side. A heat storage apparatus 96 is provided, throughout which a snake-shaped pipe for carrying air or water is placed to permit production of hot air or warm water, and which becomes a thermal source for such requirements as heating, hot water supply, etc., at night and cloudy weather.

FIGS. 13 to FIG. 21 are directed to various embodiments in accordance with the invention, wherein magnetic fluid which moves magnetism in circulation, rather than convection of air, is used for energy generation.

Figure 13:
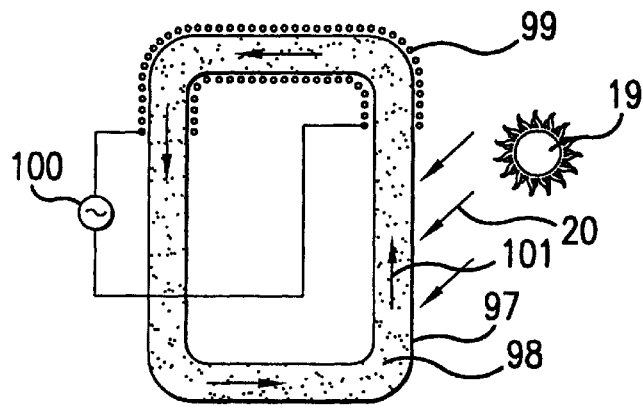
FIG. 13 is a schematic longitudinal cross-section of an eleventh embodiment of a convection energy generating system in accordance with the invention.

Referring to FIG. 13, an embodiment of the invention includes a closed pipe 97 filled with a magnetic fluid 98, for instance, a fluid containing magnetic particles which are coated and dispersed in oil without coagulation, A coil 99 is wound on part of circulating passage of closed pipe 97 to get a power source 100 from the end of coil 99.

Recently, it has been discovered that water or petroleum products react to a magnetic field, enabling water and the selected petroleum product to function as magnetic fluid 98 in the circulating passage of closed pipe 97. When solar rays 20 of the sun 19 shines on pipe conduit 97, heating same, fluid 98 moves by convection running within closed pipe conduit 97 in the direction of arrows, and electric current is generated within coil 99 by Fleming's right hand rule.

Figure 14:
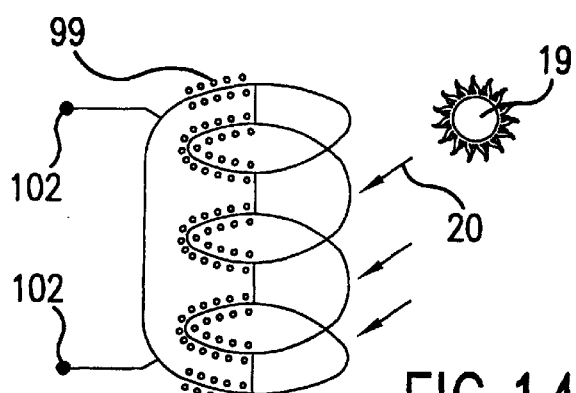
FIG. 14 is a schematic view of the pipe conduit of a twelfth embodiment in accordance with the invention.

Referring to FIG. 14, an embodiment of the invention is depicted, wherein the above described closed pipe conduit is formed to the shape of a coil 99, and coil 99 is wound on part of the closed pipe conduit to efficiently obtain electric current from a power source 102 tapped at opposed ends of coil 99.

Figure 15:
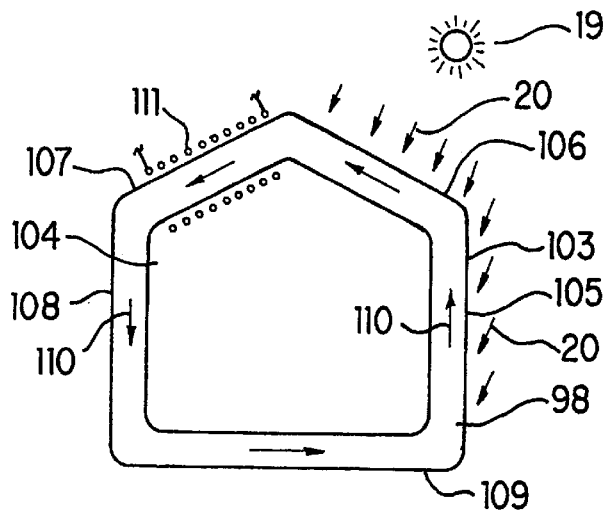
FIG. 15 is a schematic view of the pipe conduit of a thirteenth embodiment in accordance with the invention.

FIG. 15 illustrates an embodiment of the invention in which a circuit 103 is attached to a house 104. Pipe conduits 105 and 106 of circuit 103 are placed on the wall and roof on the southern side of house 104 which is impinged by solar rays 20 of the sun 19 (as indicated by the plurality of arrows) and pipe conduits 107, 108 and 109 are attached to the roof, side wall and under the floor not lit by the sun 19. As a result, the temperature difference of the various pipe conduits 105, 106, 107, 108, 109 makes magnetic fluid 98 flow in the direction of arrow 110 within circuit 103 and electricity is obtained by a coil 111.

Figure 16:
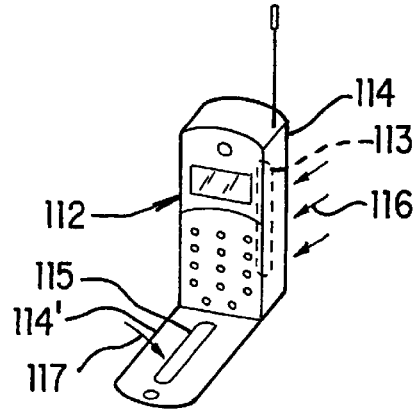
FIG. 16 is a perspective view of a fourteenth embodiment in accordance with the invention.
Figure 17:
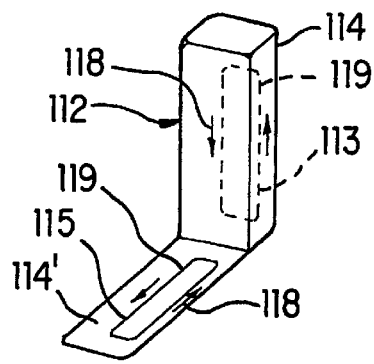
FIG. 17 is a schematic representation of the fluid passage of FIG. 16.

FIG. 16 and FIG. 17 depicts an embodiment in accordance with the invention wherein circulating pipe conduits 113 and 115 filled with magnetic fluid are set on a body 114 of a cellular phone 112 and a flipper 114', respectively, and generate electricity for cellular phone 112. Since heat 116 of the hand holding cellular phone 112 warms part of pipe conduit 113 on a body of same held by the hand, and since also the heat of breadth 117 generated by the user while speaking warms pipe conduit 115 on flipper 114', convection 118 of the magnetic fluid is produced, coil 119 thereby yielding electric power as a power source for cellular phone 112.

Figure 18:
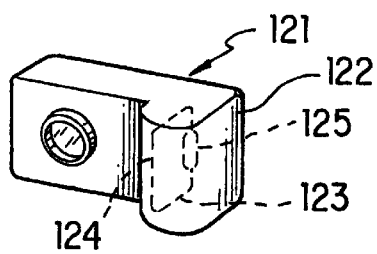
FIG. 18 is a perspective view of a fifteenth embodiment in accordance with the invention.
Figure 19:
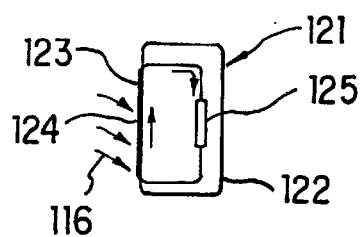
FIG. 19 is a schematic representation of the fluid passage of FIG. 18.

FIGS. 18 and 19 illustrate an embodiment in accordance with the invention wherein a circuit 123 containing magnetic fluid, a heat absorbing part 124 thereof, and coil 125, are set on a griping part 122 of a camera 121.

Figure 20:
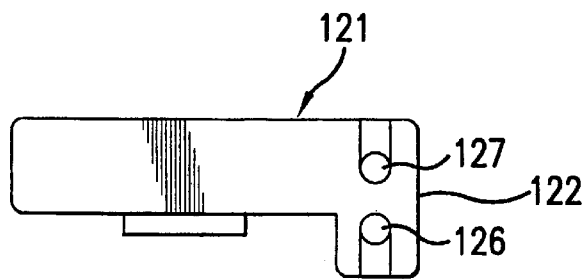
FIG. 20 is a plan view of a sixteenth embodiment in accordance with the invention.
Figure 21:
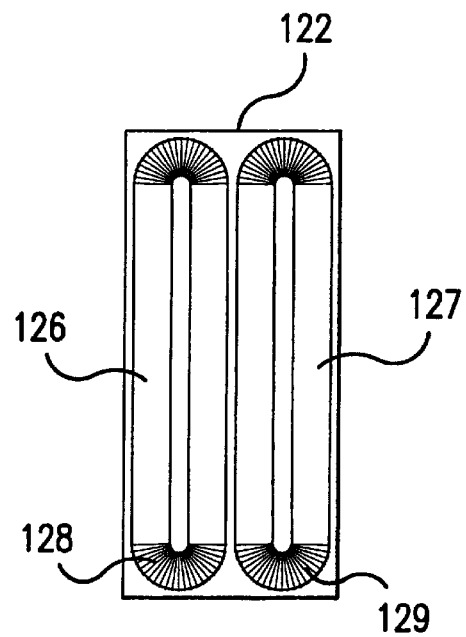
FIG. 21 is a side view of the embodiment of FIG. 20, showing the fluid passage.

FIGS. 20 and 21 depict an embodiment in accordance with the invention wherein two lines of circuits 126 and 127 are set in griping part 122. A thumb of the hand warms circuit 127 and the other four fingers transfer heat to heat absorbing part 126, so that electric current as a power source for camera 121 is obtained from coils 128 and 129.

Figure 22:
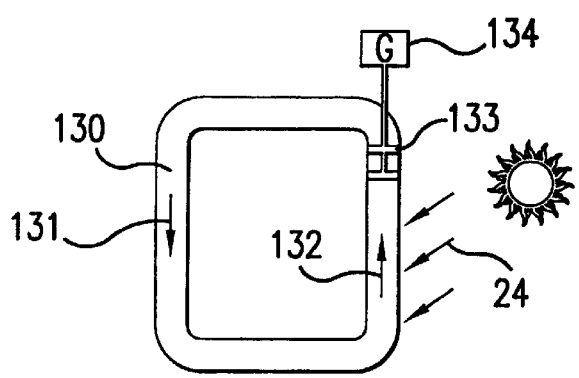
FIG. 22 is an elevational schematic representation of a pipe conduit of a seventeenth embodiment in accordance with the invention.

Referring now to FIG. 22, an embodiment in accordance with the invention is depicted in which solar rays 24 shine on part of a circuit 131 in which water 130 or other fluid media is contained for circulating flow therein and heating same up, thereby creating circulation by heat convection in the direction of arrow 132. A power generator 134 is provided to generate electricity in response to the water turbine 133 installed in circuit 131 and turned by the circulating fluid.

Figure 23:
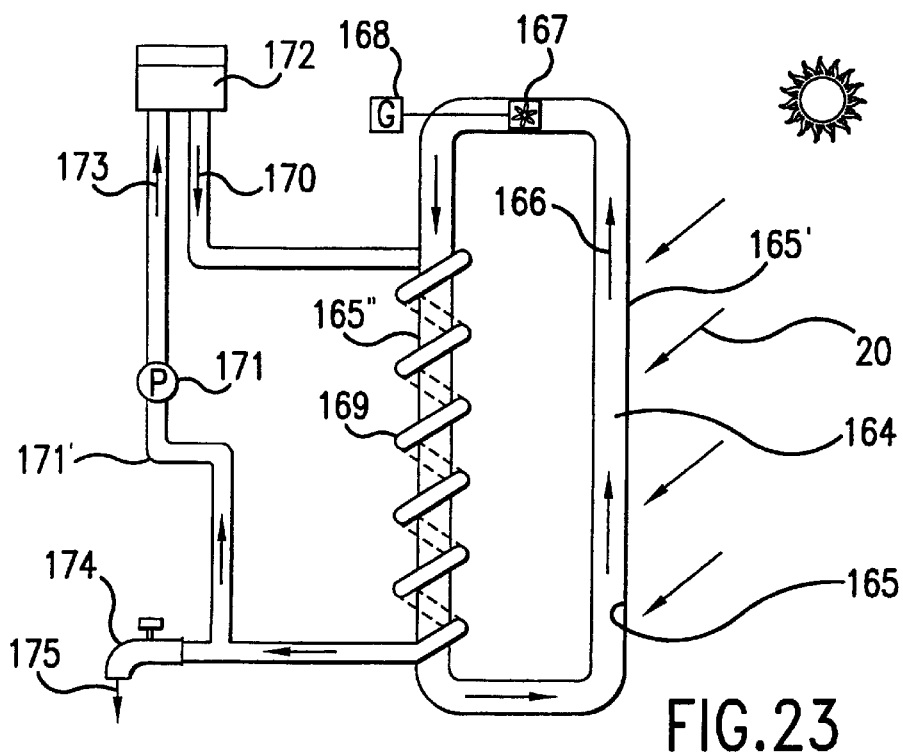
FIG. 23 is an elevational schematic representation of a pipe conduit of an eighteenth embodiment in accordance with the invention.

FIG. 23 illustrates an embodiment in accordance with the invention wherein part 165' of closed pipe 165 which is advantageously of externally black in color and in which a thermal media 164 such as water, FREON, etc., is heated up by solar rays 20. Heated thermal media 164 rises by heat convection to circulate in the direction of arrow 166 and operates power generator 168 by turning turbine 167. A thermal exchange pipe 169 is wound around closed pipe 165" on the opposite side to the heated side. When cool water 170 is supplied to heat exchange pipe 169, cool water 170 is heated, and at the same time thermal media 164 is cooled down. Cooled fluid 164 descends and is heated up by solar rays 20 to rise and circulate.

Water 170 within thermal exchange pipe 169 is heated up through water 173 which is pushed up to a water tank 172 by pump 171, and hot water 175 is supplied from cock 174. Pipe 171' is provided to increase the temperature of water within tank 172 by returning unused water to tank 172 by pump 171.

Figure 24:
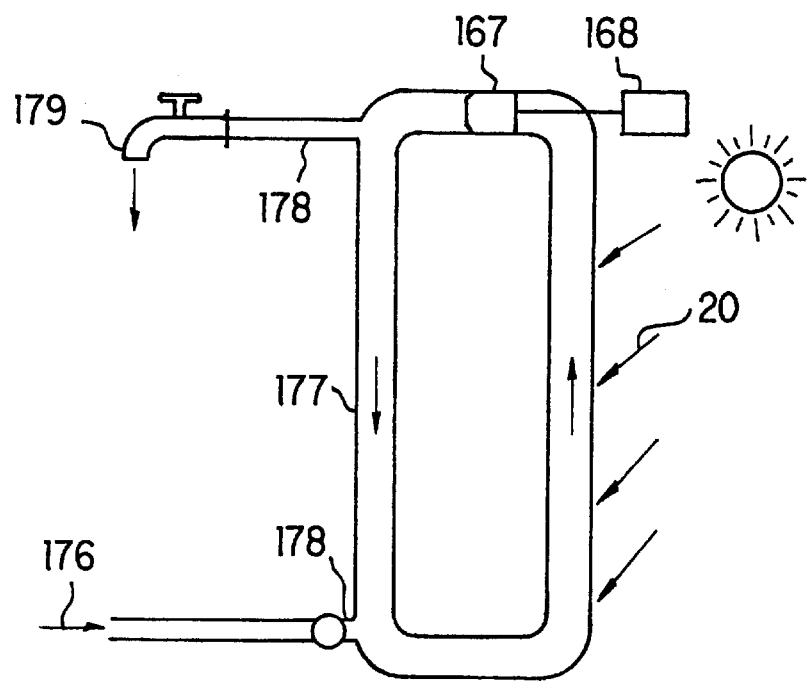
FIG. 24 is an elevational schematic representation of a pipe conduit of a nineteenth embodiment in accordance with the invention.

Turning now to FIG. 24, an embodiment is depicted in which a direct heating method is employed. Water 176 is supplied from lower part 178 of a closed pipe 177 by pressure of city water without the need for installing pushing pump 171 and water tank 171 of the previously described embodiment shown in FIG. 23. After water 176 is heated up by solar rays 20 and rises to turn turbine 167 of power generator 168, hot water is supplied from cock 179 of a junction pipe 178.

Figure 25:
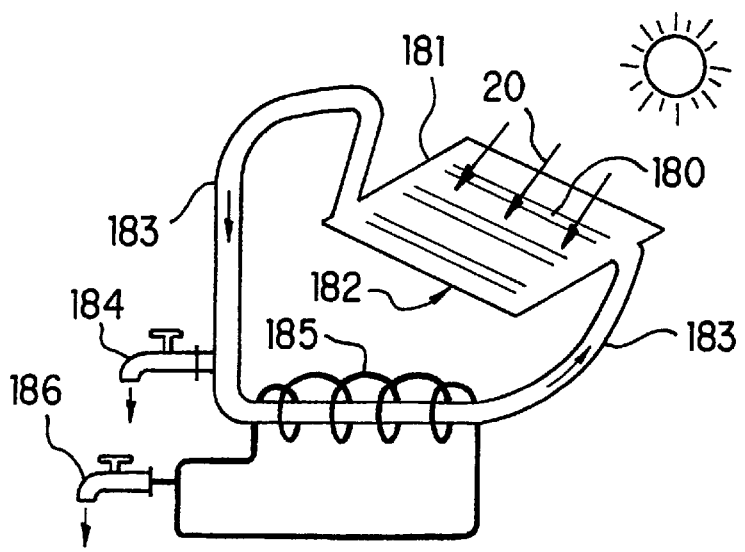
FIG. 25 is a schematic representation of a pipe conduit of a twentieth embodiment in accordance with the invention.

FIG. 25 illustrates an embodiment in accordance with the invention, wherein solar rays 20 are received by a panel consisting of a thin glass box 181 containing water pipes 180 or a hot well kept warm by inserting water pipes 180 into a vacuum glass pipe, and in which a cock 184 is fixed directly to closed water pipe 183 to obtain hot water. Where a fluid with a low boiling point, such as Freon, etc. is used instead of water, a heat exchange pipe 185 is wound on closed water pipe 183 to heat up water in heat exchange pipe 185 in order to get hot water from cock 186. Turbine 167 of power generator 168 can optionally be fixed to pipe conduit 183 for power generation.

Air, water, streaming magnetic material, oil, steam, etc. can all be used for fluid in accordance with the intended scope of the invention. The Pipe used for passing fluid is advantageously black and rough in surface to improve heat absorption, and also advantageously has fins to improve radiation and to obtain a larger temperature difference, so that convection speed can be increased.

If electric power obtained by the examples of the embodiments set forth above is arranged to charge a battery, or to be reduced to daytime energy by ice-making, or warm water is arranged to pass through heat storage material, it is possible to continuously use electric power and warm water even at night, and also surplus power can be sold to a power company to earn income.

The unique and ground breaking invention described herein will have world-wide as well as region-wide benefits in making use of warm air usually wasted, and will further increase efficiency of thermal energy. In this regard, the invention will provide energy to any country short of national resources in a manner non-polluting to the environment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An energy generator system comprising:

a conduit for channeling a convected flow of a fluid media created by a difference of heat along portions of said conduit;

said conduit forming a continuous enclosed course for receiving varying amounts of heat over exposed area portions thereof;

energy generation means responsive to said flow of media disposed along said conduit for converting energy of said flow into another form of usable energy;

said fluid media demonstrating magnetic properties; and said energy generation means including a coil wound about at least a portion of said conduit from which electrical energy is derived.

* * * * *